United States Patent Office 3,367,992
Patented Feb. 6, 1968

3,367,992
2-HYDROXYALKYL ACRYLATE AND METHACRYLATE DICARBOXYLIC ACID PARTIAL ESTERS AND THE OXYALKYLATED DERIVATIVES THEREOF
Charles R. Bearden, Lake Jackson, Tex., assignor to The Dow Chemical Company, Midland, Mich., a corporation of Delaware
No Drawing. Filed June 5, 1964, Ser. No. 373,102
14 Claims. (Cl. 260—837)

ABSTRACT OF THE DISCLOSURE

Thermosetting resins are prepared from dicarboxylic acid partial esters which may in turn be prepared by reacting 2-hydoxyalkyl acrylates or methacrylates with dicarboxylic acid anhydrides. The partial esters can be mixed with a polymerizable monomer and a polyfunctional material such as a polyepoxide, a polyisocyanate or a polyamine and cured; or alternately, the partial ester may be reacted first with the polyfunctional material and then mixed with a polymerizable monomer to form a thermosettable resin composition. The resins find utility in reinforced plastics, laminates and the like and readily accept high loadings of various inert fillers.

The present invention relates to 2-hydroxyalkyl acrylate or methacrylate dicarboxylic acid anhydride partial esters, the oxyalkylated derivatives of these esters and thermosetting resins prepared from these partial esters.

The partial esters of the present invention are the reaction products obtained by condensing substantially equal molar proportions of a hydroxy compound selected from the group consisting of 2-hydroxyalkyl acrylates and 2-hydroxyalkyl methacrylates with a dicarboxylic acid anhydride or mixtures thereof.

The oxyalkylated derivatives of these partial esters are prepared by reacting a lower alkylene oxide such as propylene oxide with the partial ester.

Hard, tough, glossy, transparent and adherent continuous thermosetting coatings and laminates having excellent strength, heat and solvent resistance are obtained by reacting an ethylenically unsaturated compound with the partial ester or the oxyalkylated derivative thereof.

Advantageously, the partial esters of the present invention or the oxyalkylated derivatives thereof may be reacted with other polyfunctional reactants such as polyepoxides, polyisocyanates, polyamines and the like before or during the time the partial ester is cured with the ethylenically unsaturated monomer to produce thermosetting resins having improved flexural strength and impact resistance.

In order for the polyfunctional reactants enumerated above to react with the oxyalkylated partial esters of the present invention however, it is preferred that an amount of dicarboxylic acid anhydride in excess of that required for the preparation of the partial ester be present in the reaction medium.

The 2-hydroxyalkyl acrylates or methacrylates which may be used to prepare the partial esters of the present invention or their oxyalkylated derivatives are preferably ones in which the 2-hydroxyalkyl group has from two to six carbon atoms.

Representative of such compounds are 2-hydroxyethyl acrylate, 2-hydroxyethyl methacrylate, 2-hydroxypropyl acrylate, 2-hydroxypropyl methacrylate, 2-hydroxybutyl acrylate and 2-hydroxybutyl methacrylate. Included in the expression 2-hydroxyalkyl acrylate or methacrylate are the oxyalkylated derivatives of these materials. For example commercially available 2-hydroxyethyl acrylate is often found to contain about 2 to 6 percent reacted ethylene oxide units in the form of 2-(2-hydroxyethoxy) ethyl acrylate and higher ethylene oxylated derivatives.

The dicarboxylic acid anhydrides which are suitable for preparing the partial esters include, for example, α,β-unsaturated dicarboxylic acid anhydrides such as maleic anhydride, chloromaleic anhydride, citraconic anhydride, itaconic anhydride, and the like, and saturated dicarboxylic acid anhydrides such as phthalic anhydride, chlorendic anhydride and mixtures thereof.

The partial esters of this invention may represented by the following formula

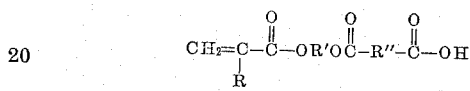

wherein R is hydrogen or methyl, R′ is an organic radical containing from 2 to 6 carbon atoms of which at least 2 extended in a chain between the adjoining oxygens, and R″ is a saturated aliphatic group, an unsaturated aliphatic group,

where X is a halogen or an aromatic group.

Alkylene oxides which may be employed to prepare the oxyalkylated derivatives of the half esters include lower alkylene oxides containing 2 to 4 carbon atoms such as ethylene oxide, propylene oxide, butylene oxide, and halogenated alkylene oxides such as epihalohydrins as epichlorohydrin.

Suitable ethylenically unsaturated compounds with which the half esters of the present invention may be cured include monovinyl aromatic hydrocarbons of the benzene series such as styrene, vinyl toluene, ethyl vinyl benzene, isopropyl styrene, tert-butyl styrene, sec-butyl styrene or mixtures thereof, α-methyl styrene, divinyl compounds of the benzene series such as divinyl benzene, halogenated etc. dichlorostyrene, diallyl phthalate, triallyl cyanurate, acrylic acid, vinyl acetate, methyl methacrylate, ethyl methacrylate, methyl acrylate, ethyl acrylate, cyclohexyl acrylate, β-hydroxyethyl acrylate, and the like.

The partial esters of the present invention are preferably prepared by condensing 0.8 to 1.2 gram molecular proportions of the dicarboxylic acid anhydride per gram molecular proportion of the 2 - hydroxyalkyl acrylate or methacrylate in the absence of a solvent at a temperature of 20° to 150° C., preferably 80° to 115° C., and at atmospheric, subatmospheric or superatmospheric pressure. Alternatively, the half ester may be prepared by simultaneously reacting acrylic acid or methacrylic acid with lower alkylene oxide such as ethylene oxide, propylene oxide, butylene oxide and halogenated derivatives of alkylene oxides as for example epihalohydrins such as epichlorohydrin, in the presence of the dicarboxylic acid anhydride.

If a mixture of saturated and unsaturated dicarboxylic acid anhydrides is desired to be reacted with the 2 - hydroxyalkyl acrylate or methacrylate it is advantageous to add a vinyl polymerization inhibitor to prevent undesirable polymerization of the half ester. Suitable vinyl polymerization inhibitors include tert-butyl catechol, hydroquinone, monoethyl ether of hydroquinone and 2,5 - di - tert - butylhydroquinone. Advantageously the vinyl polymerization inhibitor is included in the reaction mixture at a concentration of about 0.005 to about 0.015 percent by weight based on the total weight of the reactants.

To prepare the oxyalkylated partial ester, upon the completion of the esterification reaction, the partial ester is reacted with an alkylene oxide in the presence of a suitable catalyst, for example, alcoholates as $NaOCH_3$, tertiary amines such as tri(dimethylaminomethyl) phenol and quaternary ammonium salts such as tetramethyl ammonium chloride at a temperature in the range of from about 80° to about 180° C., in a sealed vessel.

Thermosetting resins may be prepared from the partial esters and their oxyalkylated derivatives by mixing from about 30 to about 90 percent by weight of the half ester with from about 10 to about 70 percent by weight of the ethylenically unsaturated crosslinking monomer.

The mixture of the half ester or oxyalkylated half ester and the ethylenically unsaturated crosslinking agent may then be cured by the application of heat or other suitable means known to the art.

In this connection, it may be mentioned that peroxy catalytic agents such as benzoyl peroxide, lauroyl peroxide, methyl ethyl ketone peroxide, and the like, can advantageously be incorporated in the mixture of half ester and ethylenically unsaturated monomer prior to their being cured to hasten the converting of the thermosetting mixture into an insoluble solvent resistant product. To further accelerate the curing of the composition, accelerating agents such as cobalt naphthenate, lead naphthenate, dimethyl aniline and the like may also be added to the mixture of the half ester and ethylenically unsaturated compound.

Advantageously, the peroxy catalytic compounds are included in the thermosetting mixtures at a concentration of about 0.1 to about 5 percent by weight based on the total weight of the thermosetting reactants and the accelerating agents are employed in the concentration range of about 0.01 to about 5 percent by weight based on the total weight of the reactants.

The thermosetting mixture may be cured over the temperature range of 20° to 150° C. preferably in the absence of air. At room temperature, the cure may require several hours, although the presence of the above-mentioned catalysts and accelerating agents and elevated temperatures in the range of 80° to 150° C. can shorten this to a few minutes. Preferred curing temperatures generally range from about 100° to about 140° C. for times ranging from 1 minute to about 1 hour.

As mentioned above, highly desirable, high strength thermosetting resins are also prepared from the half esters by reacting them with a polyepoxide, polyisocyanate or polyamine compound preferably in stoichiometric amounts before or during the time the partial ester is cured with an ethylenically unsaturated compound enumerated above. The polyepoxide, polyisocyanate or polyamine is reacted with the 2 - hydroxyalkyl acrylate or methacrylate - dicarboxylic acid anhydride ester at a temperature of 20° to 120° C. in the presence or absence of an inert solvent before the half ester is cured in the presence of an ethylenically unsaturated monomer or the polyepoxide, polyisocyanate, or polyamine may be blended with the ethylenically unsaturated monomer half ester mixture during the curing stage. If the polyepoxide, polyisocyanate, or polyamine is reacted with the half ester before crosslinking with the ethylenically unsaturated monomer, it is desirable to add a vinyl polymerization inhibitor to the reaction medium to prevent undesirable polymerization of the half ester. Suitable vinyl polymerization inhibitors include tert - butyl catechol, hydroquinone, monoethyl ether of hydroquinone, and 2,5 - di - tert - butyl hydroquinone. Advantageously the vinyl polymerization inhibitor is included in the reaction mixture at a concentration of about 0.005 to about 0.015 percent by weight based on the total weight of the reactants. If an oxyalkylated partial ester is to be reacted with any one of the above enumerated polyfunctional compounds it is essential that any one of the dicarboxylic acids enumerated above be present in the reaction mixture at equal molar proportions with the oxyalkylated partial ester.

Any of the known polyepoxides may be reacted with the half esters of the present invention or their oxyalkylated derivatives to prepare curable resins.

Useful polyepoxides are glycidyl polyethers of both polyhydric alcohols and polyhydric phenols, epoxidized fatty acids or drying oil acids, epoxidized diolefins, epoxidized di - unsaturated acid esters, as well as epoxidized unsaturated polyesters, preferably containing more than one epoxide group per molecule.

Glycidyl polyethers of polyhydric phenols are made from the reaction of a polyhydric phenol with epihalohydrin of glycerol dihalohydrin, and a sufficient amount of a caustic alkali to combine with the halogen of the halohydrin.

The preparation of these polyepoxides is described more fully in U.S. Patents 2,467,171, 2,538,072, 2,582,985, 2,615,007, and 2,698,315.

Glycidyl ethers of polyhydric alcohols are made by reacting at least about two mols of an epihalohydrin with one mol of a polyhydric alcohol such as ethylene glycol, pentaerythritol, etc., followed by dehydrohalogenation according to U.S. Patent 2,581,464.

In addition to polyepoxides made from alcohols or phenols and an epihalohydrin, polyepoxides made by the known peracid method are also suitable. Epoxides of unsaturated esters, polyesters, diolefins and the like can be prepared by reacting the unsaturated compound with a peracid. Preparation of polyepoxides by the peracid method is described in various periodicals and patents and such compounds as butadiene, ethyl linoleate, as well as di- or tri-unsaturated drying oils or drying oil acids, esters and polyesters can all be converted to polyepoxides.

Epoxidized drying oils are also well known, these polyepoxides usually being prepared by reaction of a peracid such as peracetic acid or performic acid with the unsaturated drying oil according to U.S. Patent 2,569,502.

Desirable esters are prepared by reacting unsaturated aldehydes with butadiene to form unsaturated cyclic aldehydes. These can be condensed by the Tischenko reaction to form esters or reduced to form alcohols which can subsequently be reacted with acids to form esters. In addition to epoxidized drying oils, butadiene dioxide, and monomeric esters, polymeric esters can also be epoxidized by the peracid method as described in Australian Patent 11,862, 1955. Examples of these unsaturated polyesters are those made from saturated polyhydric alcohols and unsaturated polybasic acids, for example, maleic acid, 2-butenedioic acid, 4-cyclohexene-1,2-dicarboxylic acid, dimerized linoleic acid, etc., and such alcohols as ethylene glycol, 1,6-hexanediol, 3-ethylhexanediol-1,3,pentaerythritol, etc. Other polyesters which can be epoxidized with peracetic or other peracids are made from saturated acids and unsaturated alcohols, for example, 2-butenediol-1,4, 1,5-hexanediene-3,4-diol, 2-pentene-1,5-diol, cyclohexenediol-2,5-, etc. reacted with such saturated acids or acid anhydrides as malonic, succinic, glutaric, terephthalic, etc.

Examples of such polyepoxides include diglycidyl ether, the diglycidyl ether of diethylene glycol or dipropylene glycol, the diglycidyl ether of polypropylene glycols having molecular weight up to, for example, about 2000, the triglycidyl ether of glycerine, the diglycidyl ether of resorcinol, the diglycidyl ether of 4,4'-isopropylidene diphenol, epoxy novolacs, such as the condensation product of 4,4'-methylenediphenol and epichlorohydrin and the condensation product of 4,4'-isopropylidenediphenol and epichlorohydrin, glycidyl ethers of Cashew nut oil, epoxidized soybean oil, epoxidized unsaturated polyesters, vinyl cyclohexene dioxide, dicyclopentadiene dioxide, dipentene dioxide, epoxidized polybutadiene and epoxidized aldehyde condensates such as 3,4-epoxy-6-methylcyclohexylmethyl 3,4-epoxy-6-methylcyclohexane carboxylate (Unox 201).

Suitable polyisocyanates which may be reacted with the half esters of the present invention include organic polyisocyanates such as aromatic, aliphatic and cycloaliphatic polyisocyanates, and combinations of these types. Representative polyisocyanates from which the polymers of this invention can be made include 2,4-tolylene diisocyanate, 2,6-tolylene diisocyanate, the phenylene diisocyanates, the naphthalene diisocyanates, 1,2,4-benzene triisocyanate, hexamethylene diisocyanate, trimethylene diisocyanate. ethylene diisocyanate, 1,4-cyclohexylene diisocyanate, and 1,3-cyclopentylene diisocyanate.

Suitable polyamines which may be reacted with the half esters of the present invention include melamine, hexamethylolmelamine, ether derivatives of hexamethylolmelamine such as the hexamethyl ether of hexamethylolmelamine and the hexabutyl ether of hexamethylolmelamine.

The polyepoxide, polyisocyanate or polyamine, may be reacted with the half ester or its oxyalkylated derivative, if desired, in the presence or absence of a suitable catalyst. Suitable catalysts for the reaction of polyepoxides and polyisocyanates include alcoholates such as $NaOCH_3$, tertiary amines such as tridimethylaminomethylphenol and quaternary ammonium salts such as tetramethyl ammonium chloride. For the reaction of polyamines with the half ester strong acid catalysts such as p-toluene sulfonic acid are desirable. Advantageously the catalyst is included in the reaction mixture at a concentration of about .05 to about 2 percent by weight based on the total weight of the reactants.

The hydroxyalkyl acrylate or methacrylate dicarboxylic acid anhydride partial esters or the oxyalkylated derivatives thereof when cured in the presence of an ethylenically unsaturated crosslinking monomer may be utilized for a wide variety of applications. For example, they are very useful in the preparation of pottings and castings. In this application, the partial ester, or oxyalkylated derivative thereof, which optionally may first be reacted with a polyepoxide, polyisocyanate, polyamine or other polyfunctional compound, is cured with an ethylenically unsaturated compound which desirably acts both as a solvent and curing agent for the half ester product. Examples of such compounds are styrene, orthochlorostyrene, vinyl toluene and cyclohexylacrylate. Suitable curing catalysts and accelerators are incorporated in the thermosettable mixture and the mixture is poured into a suitable mold or casting and then allowed to set at room temperature. Heat may be applied in some cases to hasten the cure.

The half esters or the oxyalkylated derivatives thereof are also useful in the preparation of laminates. In this application, fibrous sheets are first impregnated with the solution of the half ester, oxyalkylated half ester, or the polyepoxide, polyisocyanate, polyamine or other polyfunctional modified ester product desirably dissolved in an ethylenically unsaturated compound which is a solvent for the partial ester, along with suitable curing catalysts. The sheets of fibrous material are impregnated with the mixture by spreading it thereon or by dipping or otherwise immersing them in the impregnant solution. A plurality of the impregnated sheets are then superimposed and the assembly cured by heating at a temperature of about 25° to 150° C. or a combination of heat and pressure ranging from about atmospheric to about 300 or more pounds per square inch.

The resulting laminate is extremely strong and resistant against the action of organic and aqueous solvents, and exhibits excellent resistance to the action of ultraviolet light. The fibrous material used in the preparation of the laminates may be of any suitable material, such as glass cloth and matting, paper, asbestos paper, mica flakes, cotton bats, duck, muslin, canvas and the like.

In the above applications, the resulting cured products are characterized by their excellent hardness, strength, durability and good solvent resistance as well as by lack of discoloration which accompanies many of the other polyester cured systems.

The invention is illustrated more particularly by way of the following examples but, as will be more apparent, is not limited to the details thereof.

The flexural strength and flexural modulus of the castings prepared from the partial esters were determined according to ASTM D790–59T. Izod impact was determined by ASTM D256–56 and heat distortion of the castings was determined by ASTM D648–56. Toluene and water absorption of the castings were determined by ASTM D570–59aT and tensile strength and elongation were determined by ASTM D638–58T.

The flexural strength and flexural modulus of glass cloth laminates laminated with the thermosetting half ester compositions of the present invention were determined by ASTM D671–51T and weather stability was determined in a Weather-O-Meter in accordance with ASTM E42–57.

EXAMPLE 1

(A) *Preparation of half ester.*—Into a reaction vessel equipped with a means for stirring and temperature control were placed 98 grams (1 mole) of maleic anhydride and 116 grams (1 mole) of 2-hydroxyethyl acrylate. Upon heating, the maleic anhydride dissolved. The reaction mixture was heated for 5 hours at 80° C. and at the end of this time, the present acid as COOH was 23 percent, which indicated the esterification reaction was essentially complete. The product was an amber free-flowing liquid.

(B) *Preparation of casting.*—Sixty grams of the half ester of product prepared as above was mixed with 40 grams of styrene, 1 percent by weight methyl ethyl ketone peroxide and 0.3 percent by weight cobalt naphthenate. This mixture was then thoroughly stirred and poured into an 18-inch x 6-inch x ⅛-inch metal cavity mold. The mixture was allowed to stand at room temperature for 16 hours, after which time the cast sheet was removed from the mold. The cast sheet at the end of this time period was a clear, solvent resistant casting with the following physical properties:

Flexural strength, p.s.i. _____ 20,000
Heat distortion temperature, ° F. _____ 250

EXAMPLE 2

A casting was prepared by reacting 40 grams of the 2-hydroxyethyl acrylate-maleic anhydride half ester of Example 1(A) with 60 grams of cyclohexyl acrylate following the procedure of Example 1(B). The physical properties of the casting are listed below.

Flexural strength, p.s.i. _____ 10,700
Flexural modulus, p.s.i. _____ $2.69 \times 10^5$
Izod impact ft. lbs./in. notch _____ 0.366
Heat distortion, ° F. _____ 127
Toluene absorption, percent _____ 9.09
Water absorption, percent _____ 0.104
Tensile strength, p.s.i. _____ 6,900
Elongation, percent _____ 11.4

EXAMPLE 3

Castings were prepared by reacting 40 grams of the 2-hydroxyethyl acrylate-maleic anhydride half ester of Example 1(A) with varying concentrations of a crosslinking mixture of styrene and cyclohexyl acrylate following the procedure of Example 1(B). The physical properties of the castings prepared therefrom are listed in Table I below.

TABLE I

| Sample No. | Crosslinking Agent | | Physical Properties of Castings | | | | | | | |
|---|---|---|---|---|---|---|---|---|---|---|
| | Styrene (grams) | Cyclohexyl acrylate (grams) | Flexural Strength, p.s.i. | Flexural Modulus, p.s.i. | Izod Impact, ft. lbs./in. notch | Heat Distortion, °F. | Toluene Absorption, percent | Water Absorption, percent | Tensile Strength, p.s.i. | Elongation, percent |
| 1 | 20 | 40 | 14,800 | 3.12×10⁵ | .287 | 152 | 1.65 | 0.10 | 9,700 | 7.2 |
| 2 | 30 | 30 | 15,900 | 3.33×10⁵ | .274 | 165 | 0.93 | 0.106 | 6,900 | 4.4 |
| 3 | 40 | 20 | 17,000 | 3.18×10⁵ | .300 | 186 | 0.46 | 0.105 | 8,300 | 4.8 |
| 4 | 50 | 10 | 17,500 | 3.53×10⁵ | .269 | 210 | 0.020 | 0.116 | 7,700 | 4.6 |

EXAMPLE 4

(A) *Preparation of half ester polyepoxide modified reaction product.*—One hundred and twenty grams of the half ester prepared in Example 1(A) was mixed with 90 grams of the diglycidyl ether of 4,4′-isopropylidenediphenol and 1 gram of tri(dimethylaminomethyl) phenol. The mixture was heated at 80° C. for 2 hours and a syrupy mixture having a viscosity at 25° C. of 1600 cps. was formed.

(B) *Preparation of laminates.*—To 40 grams of the product prepared in (A) was added 60 grams of styrene, 1.5 percent by weight methyl ethyl ketone peroxide and 0.5 percent by weight cobalt naphthenate.

Glass cloth (United Merchants No. 1542, woven fiberglass tape 8.502 oz./sq. yd.) was saturated with the catalyzed solution by repeated dipping.

Twelve plies of the treated cloth were superimposed on each other. After 15 hours at 35° C. the cured laminate had the following properties:

| | |
|---|---|
| Resin content, percent | 40 |
| Rockwell hardness | 106 |
| Flexural strength, p.s.i. | 49,500 |
| Flexural modulus, p.s.i. | 3×10⁶ |
| Flexural strength, p.s.i. at 160 °F. | 24,000 |
| Flexural modulus, p.s.i. at 160 °F. | 1.2×10⁶ |
| Flexural strength, p.s.i. after 2 hrs. H₂O boil | 40,000 |
| Flexural modulus, p.s.i. after 2 hrs. H₂O boil | 2.5×10⁶ |

Weather stability, at the end of 1000 hrs., no apparent effect.

(C) *Preparation of casting.*—A clear casting was prepared by reacting 40 grams of the half ester polyepoxide reaction product prepared in (A) by mixing 60 grams styrene and 0.5 percent by weight benzoyl peroxide with the product and pouring the syrupy mixture into an 18 x 6 x ⅛-inch cavity mold. The mixture was allowed to remain in the mold for 16 hours at 55° C. and an additional 0.75 hour at 127° C. after which time the casting was removed from the mold. The casting was found to be colorless and infusible and had the following physical properties:

| | |
|---|---|
| Specific gravity | 1.159 |
| Flexural strength, p.s.i. | 18,500 |
| Flexural modulus, p.s.i. | 5×10⁵ |
| Water absorption, percent (24 hrs.) | 0.126 |
| Toluene absorption, percent (24 hrs.) | 0.034 |
| Heat distortion (264 p.s.i.) | 227 °F. |
| Izod impact ft. lbs./in. notch | 0.4 |

EXAMPLE 5

A 12-ply glass cloth laminate was prepared according to the procedure of Example 4(B) using 60 grams of the product of Example 4(A), 40 grams of styrene, 1 percent by weight of methyl ethyl ketone peroxide and 0.3 percent by weight cobalt naphthenate. This laminate had a flexural strength of 50,900 p.s.i. and after exposure in a Weather-O-Meter for 1500 hours showed no loss in flexural strength and no change in appearance.

EXAMPLE 6

A 12-ply glass cloth laminate was prepared according to the procedure of Example 4(B) using 70 grams of the product of Example 4(A), 30 grams of styrene, 1 percent by weight methyl ethyl ketone peroxide and 0.3 percent by weight cobalt naphthenate. The glass laminate was cured for 15 hours at 35° C. and had the following properties:

| | |
|---|---|
| Flexural strength, p.s.i. | 40,000 |
| Flexural modulus, p.s.i. | 3×10⁶ |
| Flexural strength, p.s.i. after 2 hrs. H₂O boil | 42,000 |

EXAMPLE 7

A casting was prepared according to the procedure of Example 6 using 30 grams of the product of Example 4(A), 70 grams of styrene, 1 percent by weight of methyl ethyl ketone peroxide, and 0.3 percent by weight cobalt naphthenate. After pouring into a mold and curing for 16 hours at 55° C., a clear casting was obtained having the following physical properties:

| | |
|---|---|
| Flexural strength, p.s.i. | 16,000 |
| Flexural modulus, p.s.i. | 5×10⁵ |
| Izod impact, ft. lbs./in. notch | 0.3 |
| Heat distortion °F. | 193 |

EXAMPLE 8

A half ester was prepared from 6.5 pounds of β-hydroxypropyl acrylate and 4.9 pounds of maleic anhydride following the procedure of Example 1(A). The mixture was heated for 2 hours at 110° C. The half ester was reacted with 8.6 pounds of the diglycidyl ether of 4,4′-isopropylidenediphenol in the presence of 1.2 grams hydroquinone and 10.2 grams of tridimethylaminoethylphenol at 115° C. for 2 hours. A casting was prepared following the procedure of Example 1(B) by mixing 40 grams of this product with 60 grams of styrene, 1 gram benzoyl peroxide, and curing for about 16 hours at 55° C. followed by additional heating at 138° C. for 0.75 hr. after which time the cast sheet was removed from the mold. The cast sheet at the end of this period was a clear, solvent resistant casting with the following physical properties:

| | |
|---|---|
| Flexural strength, p.s.i. | 16,700 |
| Flexural modulus, p.s.i. | 3.66×10⁵ |
| Izod impact, ft. lbs./in. notch | 0.278 |
| Heat distortion, °F. | 179 |
| Toluene absorption, percent (24 hrs.) | 3.07 |
| Water absorption, percent (24 hrs.) | 0.097 |
| Tensile strength, p.s.i. | 5,900 |
| Elongation, percent | 3.2 |

EXAMPLE 9

The procedure of Example 8 was repeated with the exception that vinyl toluene was substituted for styrene as the ethylenically unsaturated crosslinking agent to prepare a casting which had the following physical properties:

| | |
|---|---|
| Flexural strength, p.s.i. | 16,200 |
| Flexural modulus, p.s.i. | 3.82×10⁵ |
| Izod impact, ft. lbs./in. notch | 0.198 |
| Heat distortion, °F. | 186 |
| Toluene absorption, percent (24 hrs.) | 1.76 |
| Water absorption, percent (24 hrs.) | 0.088 |
| Tensile strength, p.s.i. | 5600 |
| Elongation, percent | 4.6 |

EXAMPLE 10

The procedure of Example 9 was repeated with the exception that orthochlorostyrene was substituted for styrene as the ethylenically unsaturated cross-linking agent to prepare a casting which had the following physical properties:

| | |
|---|---|
| Flexural strength, p.s.i. | 15,300 |
| Flexural modulus, p.s.i. | $4.45 \times 10^5$ |
| Izod impact, ft. lbs./in. notch | 0.262 |
| Heat distortion, °F. | 185 |
| Toluene absorption, percent (24 hrs.) | 0.49 |
| Water absorption, percent (24 hrs.) | 0.083 |
| Tensile strength, p.s.i. | 6000 |
| Elongation, percent | 3.8 |

EXAMPLE 11

A half ester was prepared by reacting 116 grams of 2-hydroxyethyl acrylate with 98 grams of maleic anhydride according to the procedure of Example 1(A). The half ester was then reacted with 89 grams of an epoxy novolac comprised of the condensation product of 4,4'-methylenediphenol and epichlorohydrin and 98 grams of the diglycidyl ether of 4,4'-isopropylidenediphenol in the presence of 0.01 gram hydroquinone at 100° C. for about 2 hours.

A casting was prepared by reacting 40 grams of the above prepared product with 60 grams of styrene following the procedure of Example 1(B). The casting prepared in this manner had the following physical properties:

| | |
|---|---|
| Flexural strength, p.s.i. | 19,300 |
| Flexural modulus, p.s.i. | $5.46 \times 10^5$ |
| Izod impact, ft. lbs./in. notch | 0.269 |
| Heat distortion, °F. | 210 |
| Toluene absorption, percent (24 hrs.) | 0.020 |
| Water absorption, percent (24 hrs.) | 0.116 |
| Tensile strength, p.s.i. | 7,700 |
| Elongation, percent | 4.6 |

EXAMPLE 12

A half ester was prepared by reacting 116 grams of 2-hydroxyethyl acrylate with 98 grams of maleic anhydride according to the procedure of Example 1(A). The half ester was then reacted with 263 grams of an epoxy novolac comprised of the condensation product of 4,4'-isopropylidenediphenol and epichlorohydrin and 95 grams of the diglycidyl ether of 4,4'-isopropylidenediphenol in the presence of 0.014 gram hydroquinone and 0.45 gram of tri(dimethylaminoethyl) phenol at 100° C. for 2 hours.

A casting was prepared by reacting 55.5 grams of the above prepared product with 45.5 grams of styrene, following the procedure of Example 1(B). The casting prepared in this manner had the following physical properties:

| | |
|---|---|
| Flexural strength, p.s.i. | 18,300 |
| Flexural modulus, p.s.i. | $4.13 \times 10^5$ |
| Izod impact, ft. lbs./in. notch | 0.40 |
| Heat distortion, °F. | 202 |
| Toluene absorption, percent (24 hrs.) | 0.32 |
| Water absorption, percent (24 hrs.) | 0.18 |
| Tensile strength, p.s.i. | 11,700 |
| Elongation, percent | 8.0 |

EXAMPLE 13

A half ester was prepared from 260 grams of β-hydroxyethyl methacrylate and 186 grams of maleic anhydride following the procedure of Example 1(A). The mixture was heated for 4 hours at 80° C.

Two hundred and twenty-eight grams of the half ester was reacted with 170 grams of the diglycidyl ether of 4,4'-isopropylidenediphenol in the presence of 4 grams of tri(dimethylaminomethyl)phenol at 80° C. for 1 hour.

A casting was prepared following the procedure of Example 1(B) by mixing 40 grams of this product with 60 grams of styrene, 1.5 grams methyl ethyl ketone peroxide, 0.4 gram cobalt naphthenate, and heating for about 16 hours at 40° C., after which time the cast sheet was removed from the mold. The cast sheet at the end of this period was a clear, solvent resistant casting with the following physical properties:

| | |
|---|---|
| Flexural strength, p.s.i. | 14,450 |
| Flexural modulus, p.s.i. | $4 \times 10^5$ |

EXAMPLE 14

A half ester of β-hydroxyethyl acrylate and maleic anhydride was prepared according to Example 1(A) and 24 grams of this half ester was mixed with 60 grams of styrene and 16 grams of 3,4-epoxy-6-methylcyclohexylmethyl 3,4-epoxy-6-methylcyclohexane carboxylate, 1 percent by weight methyl ethyl ketone peroxide and 0.3 percent by weight cobalt naphthenate. A 12-ply glass cloth laminate was prepared according to the procedure of Example 4(B) by soaking a glass cloth in the catalyzed mixture and curing for 16 hours at 35° C. and an additional 30 minutes at 149° C. The cured glass cloth laminate had the following physical properties:

| | |
|---|---|
| Flexural strength, p.s.i. | 45,600 |
| Weather stability at end of 1500 hrs., no apparent effect. | |

EXAMPLE 15

A half ester was prepared from 116 grams of β-hydroxyethyl acrylate and 98 grams maleic anhydride following the procedure of Example 1(A). Two-hundred and fourteen grams of the half ester was then reacted with 87 grams of tolylene diisocyanate in the presence of 0.2 gram di(methylaminomethyl) phenol and 0.01 gram hydroquinone at 90° C. for 2.5 hours. The percent acid remaining was determined to be 1.95% indicating that essentially complete reaction of the materials had occurred.

Clear solvent resistant castings are prepared from this half ester-diisocyanate reaction product according to the procedure of Example 4(C), having excellent flexural and tensile strengths.

EXAMPLE 16

A half ester was prepared from 116 grams of β-hydroxyethyl acrylate and 98 grams of maleic anhydride following the procedure of Example 1(A).

A casting was prepared following the procedure of Example 1(B) fifty-two grams of the half ester was mixed with 38 grams of melamine, 8 grams of the hexamethyl ether of hexamethylolmelamine, 40 grams styrene and 8 grams β-hydroxyethyl acrylate in the presence of 0.5 gram methyl ethyl ketone peroxide and 0.5 gram cobalt naphthenate. The mixture was cured at 40° C. for 16 hours and at 150° C. for an additional 10 minutes. The flexural strength of the cure casting was determined to be 16,000 p.s.i. and had a Durometer hardness of 51.

EXAMPLE 17

Into a reaction vessel equipped with a means for stirring and temperature control are placed 148 grams (1 mole) of phthalic anhydride and 116 grams (1 mole) or 2-hydroxyethyl acrylate. The reaction mixture is heated for 5 hours at 80° C. and at the end of this time the esterification reaction is essentially complete. Clear, solvent resistant castings are prepared from this half ester reaction product according to the procedure of Example 4(C) having excellent flexural and tensile strengths.

In place of the 2-hydroxy ethyl acrylate used in the reaction of Example 17, there can be substituted an equivalent amount of another 2-hydroxyalkyl acrylate or methacrylate compound mentioned above which may be reacted with equivalent amounts of dicarboxylic acid anhydrides such as citraconic anhydride and itaconic anhydride to prepare half esters which can be interpolymerized and cured in the presence of equivalent amounts of ethylenically unsaturated monomers mentioned above and may optionally be also reacted with equivalent amounts of polyepoxides mentioned above to produce clear, infusible coatings and laminates having excellent strength, heat and solvent resistance.

EXAMPLE 18

(A) *Preparation of oxyalkylated half ester.*—Into a stainless steel reaction vessel equipped with a means for stirring and temperature control were placed 2.75 lbs. of β-hydroxypropyl acrylate, 3.1 lbs. phthalic anhydride and 0.9 gram hydroquinone. The temperature of the reaction vessel was raised to 80° C. and the reaction mixture was purged with air for 15 minutes to activate the inhibitor after which 5.0 cc. of tri-(dimethylaminoethyl) phenol was added. The temperature of the reaction vessel was raised to 100° C. for 30 minutes after which time 6.2 lbs. of maleic anhydride was added to the reaction vessel. The reaction vessel was sealed and heated an additional 15 minutes at 100° C. after which time 4.6 lbs. of propylene oxide was gradually fed to the reaction vessel at a temperature of 80° to 110° C. and a pressure of 40 p.s.i.g. maximum. After the completion of the propylene oxide addition, the mixture was digested at 100° C. for 3 hours and the free carboxylic acid content was determined to be 7.5 percent. The pressure in the reaction vessel was reduced to atmospheric and the liquid resin removed from the reaction vessel.

(B) *Preparation of casting.*—Fifty grams of the oxyalkylated half ester product prepared as above was mixed with 50 grams of styrene, 1.5 percent by weight methyl ethyl ketone peroxide and 0.5 percent by weight cobalt naphthenate. This mixture was then thoroughly stirred and poured into an ⅛-inch x 6-inch x 10-inch metal cavity mold. The mixture was heated at 35° C. for 48 hours followed by heating at 138° C. for 45 minutes after which time the cast sheet was removed from the mold. The cast sheet at the end of this time period was a clear, solvent resistant casting with the following physical properties:

Flexural strength, p.s.i. _____ 14,000
Flexural modulus, p.s.i. _____ $4.68 \times 10^6$
Water absorption, percent _____ 0.1

(C) *Preparation of laminates.*—To 50 grams of oxyalkylated product prepared in (A) was added 50 grams of styrene, 1.5 percent by weight methyl ethyl ketone peroxide and 0.5 percent by weight cobalt naphthenate.

Glass cloth (United Merchants No. 1542, woven fiberglass tape 8.502 oz./sq. yd.) was saturated with the catalyzed solution by repeated dipping.

Twelve plies of the treated cloth were superimposed on each other. The laminate was heated for 48 hours at 35° C. at 10 p.s.i.g. The cured laminate had the following properties:

Flexural strength, p.s.i. _____ 47,000
Flexural strength, p.s.i. after 2 hrs. water boil _____ 22,000
Flexural modulus, p.s.i. after 2 hrs. water boil _____ $1.78 \times 10^6$

EXAMPLE 19

Into a stainless steel reaction vessel equipped with a means for stirring and temperature control were placed 116 grams of β-hydroxyethyl acrylate, 98 grams maleic anhydride, 0.02 gram (0.01 percent) hydroquinone. The temperature of the reaction vessel was raised to 80° C. and the reaction mixture was purged with air for 15 minutes to activate the hydroquinone. The reaction vessel was sealed and heated an additional 45 minutes at 110° C. after which time 44 grams of propylene oxide was gradually fed to the reaction vessel at a temperature of 80° to 110° C. producing a pressure of about 40 p.s.i.g. maximum. After completion of the propylene oxide addition the reactants were digested for about 3 hours after which time the pressure in the reaction vessel was reduced to atmospheric and the liquid resin removed from the reaction vessel.

(B) *Preparation of casting.*—Two-hundred fifty grams of the oxyalkylated half ester product prepared as above was mixed with 1089 grams of styrene, 98 grams maleic anhydride, 350 grams of the diglycidyl ether of 4,4′-isopropylidenediphenol, and 1.0 percent by weight methyl ethyl ketone peroxide. This mixture was then thoroughly stirred and poured into an ⅛-inch x 6-inch x 10-inch metal cavity mold. The mixture was heated at 35° C. for 16 hours followed by heating at 138° C. for 1 hour after which time the cast sheet was removed from the mold. The cast sheet at the end of this time period was a clear, solvent resistant casting having a flexural strength of 13,860 p.s.i.

When the above procedure was repeated with the exception that 1.0% by weight benzoyl peroxide was employed as the curing catalyst, the casting had a flexural strength of 18,950 p.s.i.

EXAMPLE 20

A number of additional polyepoxide modified oxyalkylated half esters were prepared following the procedure of Example 19 with the exception that the amounts of the reactants of which the half ester was composed was varied. Two compositions of these polyepoxide modified alkyloxylated half esters are listed in Table I below.

TABLE I

| Sample No. | β-Hydroxyalkyl acrylate, percent | Phthalic anhydride, percent | Maleic anhydride, percent | Propylene oxide, percent | Diglycidyl ether of 4,4′-isopropylidenediphenol, percent |
|---|---|---|---|---|---|
| A | 13.6 | 15.8 | 31.4 | 20.0 | 19.2 |
| B | 9.4 | 25.0 | 24.6 | 25.8 | 15.2 |

The physical properties of castings prepared by reacting 50 grams of the polyepoxide modified oxyalkylated half esters with 50 grams styrene following the procedure of Example 1(B), are listed below.

| | From casting sample | |
|---|---|---|
| | A | B |
| Water absorption, percent | 0.06 | 0.10 |
| Tensile strength, p.s.i. | 10,000 | 8,600 |
| Elongation, percent | 7.3 | 4.8 |

A 12-ply glass cloth laminate was prepared according to the procedure of Example 1(C) using 50 grams sample B and 50 grams styrene. A laminate was also prepared by a similar procedure using 50 grams of product A and 50 grams styrene, except that style 181 glass cloth was used instead of style 1542, the difference being the texture, weave and surface of the cloth. The cured laminate had the following properties:

| | Laminate from sample | |
|---|---|---|
| | A | B |
| Flexural strength, p.s.i. | 60,600 | 43,700 |
| Flexural modulus, p.s.i. | $4.8 \times 10^6$ | $4.4 \times 10^6$ |
| Flexural strength, p.s.i., after 2 hrs. water boil | 54,200 | 23,700 |
| Flexural modulus, p.s.i., after 2 hrs. water boil | $4.4 \times 10^6$ | $2.6 \times 10^6$ |

EXAMPLE 21

Into a reaction vessel equipped with a means for stirring, temperature control and purging were placed 5.5 lbs.

of 2-hydroxyethyl acrylate, 4.15 lbs. of maleic anhydride and 1.8 g. of hydroquinone and the vessel was purged for 5 minutes with air in order to activate the hydroquinone. The temperature was raised to 80° C., maintained thereat for ½ hr., then raised to 110° C. for 2 hours additional time whereupon propylene oxide was added until the acid content of the mixture was 0.65% (by titration). At this time, the mixture was cooled to 80° C., 7.0 g. of tris(dimethylaminoethyl)phenol and 12.45 lbs. of maleic anhydride were added, and the mixture was digested for 2 hours to an acid content (COOH) of 22.7, 5 lbs. of propylene oxide were then added and the mixture was digested for 3 hours to an acid content (COOH) of 8.0%. The reaction mixture was cooled to 60° C., 7.0 grams of tri(dimethylaminoethyl)phenol and 7.45 lbs. of diglycidyl ether of 4,4'-isopropylidenediphenol were added and the mixture was digested for 2½ hrs. at 100° C. until the acid content (COOH) was 0.75%. The mixture was then cooled to 60° C. and 24.7 lbs. of styrene were added.

A casting was prepared according to the procedure of Example 1(B) by using 100 g. of the above product with 1% benzoyl peroxide and curing at 55° C. for 24 hours; then at 280° F. for 45 minutes. The casting at the end of this period was a clear, solvent-resistant product with the following properties:

| | |
|---|---|
| Flexural strength, p.s.i. | 16,300 |
| Flexural modulus, p.s.i. | 5.07×10⁵ |
| Izod impact, ft. lbs./in. notch | 0.258 |
| Heat distortion, ° F. | 139 |
| Water absorption, 24 hrs. | 0.128% |
| Tensile strength, p.s.i. | 10,200 |
| Percent elongation | 6.6 |

In place of the propylene oxide used in the reaction of Example 21 there may be substituted an equivalent amount of another alkylene oxide such as ethylene oxide, butylene oxide and the like to oxyalkylate equivalent amounts of half esters prepared from the reaction of a 2-hydroxyalkyl acrylate with dicarboxylic acid anhydrides enumerated above to prepare oxyalkylated half esters which can be interpolymerized and cured in the presence of equivalent amounts of ethylenically unsaturated monomers mentioned above and may optionally be also reacted with equivalent amounts of polyepoxides mentioned above to produce clear, infusible coatings and laminates having excellent strength, heat and solvent resistance.

In addition, the compositions of the present invention may include other additives such as plasticizers, fillers, pigments and the like. The thermoset resins of the present invention can be compounded with relatively large amounts, i.e. up to 96 percent weight of non-reactive plasticizers and additives such as glass, metal filings, inorganic fillers such as sand and clay to further improve the useful properties of the thermoset resin. The resin in spite of this heavy loading exhibits excellent flow characteristics permitting the loaded compositions to readily flow in and fill a mold space. The addition of clay, for example to the resin improves the flexural modulus, weathering, solvent and stress cracking resistance of the resin as is illustrated in the following example.

EXAMPLE 22

One hundred and twenty grams of the half ester prepared in Example 1(A) was mixed with 90 grams of the diglycidyl ether of 4,4'-isopropylidenediphenol and 1 gram of tridimethylaminomethyl phenol. The mixture was heated at 80° C. for 2 hours and a syrupy mixture having a viscosity at 25° C. of 1600 cps. was formed. To 40 grams of this product were added 60 grams of styrene, 150 grams of a hydrated aluminum silicate (kaolin) ASP-400 grade, product of Minerals and Chemicals Phillipp Corp. and the mixture was blended with a high speed mixer to a smooth, free flowing liquid.

This product was then laid with a chopped glass mat in a press, 150 p.s.i. pressure was applied at 250° F. for 5 minutes. The laminate was approximately 0.1 inch and had the following properties.

| | |
|---|---|
| Flexural strength, p.s.i. | 33,000 |
| Flexural modulus, p.s.i. | 2.4×10⁶ |

What is claimed is:

1. A thermosettable resin composition which comprises a mixture of
   (A) a resin containing terminal vinylidene groups prepared by reacting (1) a polyfunctional material selected from the group consisting of polyepoxides, polyisocyanates and polyamines in essentially equivalent amounts with (2) a dicarboxylic acid partial ester having the formula

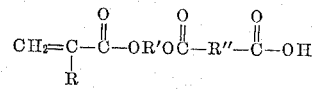

wherein R is hydrogen or methyl, R' is an organic radical containing from 2 to 6 carbon atoms of which at least 2 extend in a chain between the adjoining oxygens, and R" is a saturated aliphatic group, an unsaturated aliphatic group,

where X is a halogen or an aromatic group; and
   (B) a polymerizable ethylenically unsaturated compound.

2. The resin composition of claim 1 wherein the group R' is —CH₂CH₂— or

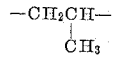

3. The resin composition of claim 1 wherein the group R" is >C=C< or ortho-phenylene.

4. The resin composition of claim 1 wherein the polyfunctional material is a glycidyl polyether of a polyhydric phenol or a polyhydric alcohol.

5. The resin composition of claim 4 wherein the polyfunctional material is a diglycidyl ether of 4,4'-isopropylidenediphenol.

6. The resin composition of claim 4 wherein the polyfunctional material is an epoxy novolac.

7. The resin composition of claim 1 wherein the polyfunctional material is 3,4-epoxy-6-methylcyclohexylmethyl, 3,4-epoxy-6-methylcyclohexane carboxylate.

8. The resin composition of claim 1 wherein the polyfunctional material is tolylene diisocyanate.

9. The resin composition of claim 1 wherein the polyfunctional material is melamine.

10. The resin composition of claim 1 wherein the polyfunctional material is an alkylated formaldehydemelamine condensation product.

11. The resin composition of claim 1 wherein the polymerizable monomer is styrene, o-chlorostyrene, vinyltoluene or cyclohexyl acrylate.

12. The resin composition of claim 1 wherein the polymerizable monomer is a monovinyl aromatic hydrocarbon.

13. The resin composition of claim 1 wherein the polymerizable monomer is an alkyl ester of acrylic or methacrylic acid.

14. The resin composition of claim 1 containing up to 75 percent by weight of the total mixture of inert fillers.

References Cited

UNITED STATES PATENTS

| | | | |
|---|---|---|---|
| 2,908,663 | 10/1959 | Masters | 260—837 |
| 3,150,118 | 9/1964 | Clemens | 260—78.5 |

MURRAY TILLMAN, *Primary Examiner.*

PAUL LIEBERMAN, *Assistant Examiner.*